US012138222B2

(12) United States Patent
Adamo et al.

(10) Patent No.: US 12,138,222 B2
(45) Date of Patent: Nov. 12, 2024

(54) MEDICINAL PRODUCT COMPRISING A CONTAINER AND AN AQUEOUS LIQUID CONTAINING BICARBONATE

(71) Applicant: B. Braun Melsungen AG, Melsungen (DE)

(72) Inventors: Vincent Adamo, Marly (CH); Hervé Jean Schwebel, Mulhouse (FR)

(73) Assignee: B. Braun Melsungen AG, Melsungen (DE)

( * ) Notice: Subject to any disclaimer, the term of this patent is extended or adjusted under 35 U.S.C. 154(b) by 452 days.

(21) Appl. No.: 17/439,582

(22) PCT Filed: Apr. 16, 2020

(86) PCT No.: PCT/EP2020/060669
§ 371 (c)(1),
(2) Date: Sep. 15, 2021

(87) PCT Pub. No.: WO2020/212471
PCT Pub. Date: Oct. 22, 2020

(65) Prior Publication Data

US 2022/0151870 A1 May 19, 2022

(30) Foreign Application Priority Data

Apr. 18, 2019 (EP) .................................... 19170164

(51) Int. Cl.
*A61J 1/14* (2023.01)
*A61J 1/10* (2006.01)
*A61J 1/16* (2023.01)

(52) U.S. Cl.
CPC ............... *A61J 1/1468* (2015.05); *A61J 1/10* (2013.01); *A61J 1/16* (2013.01)

(58) Field of Classification Search
CPC ............... A61J 1/10; A61J 1/1468; A61J 1/16
See application file for complete search history.

(56) References Cited

U.S. PATENT DOCUMENTS 4,735,832 A 4/1988 Ichikawa et al.
6,007,529 A * 12/1999 Gustafsson ............. B32B 27/32 604/416

(Continued)

FOREIGN PATENT DOCUMENTS

CN 1222069 A 7/1999
CN 101401769 A 4/2009

(Continued)

OTHER PUBLICATIONS

Search Report received in European Application No. 19170164.8-1113 dated Oct. 22, 2019, 7 pages.

(Continued)

*Primary Examiner* — Jessica Arble
(74) *Attorney, Agent, or Firm* — Christopher A. Rothe; CM Law

(57) ABSTRACT

A medicinal product, in particular a sterile medicinal product, includes a flexible mono-chamber container and an aqueous liquid containing bicarbonate and having a physiological pH value. The container includes a first side wall and a second side wall. The first side wall and the second side wall include a barrier material capable of preventing or retarding escape of carbon dioxide from the container and/or intake of carbon dioxide into the container such that the pH value of the aqueous liquid is maintained or substantially maintained during a shelf life at room temperature of the medicinal product for at least 12 months.

23 Claims, 2 Drawing Sheets

(56) References Cited

U.S. PATENT DOCUMENTS

Figure 3:
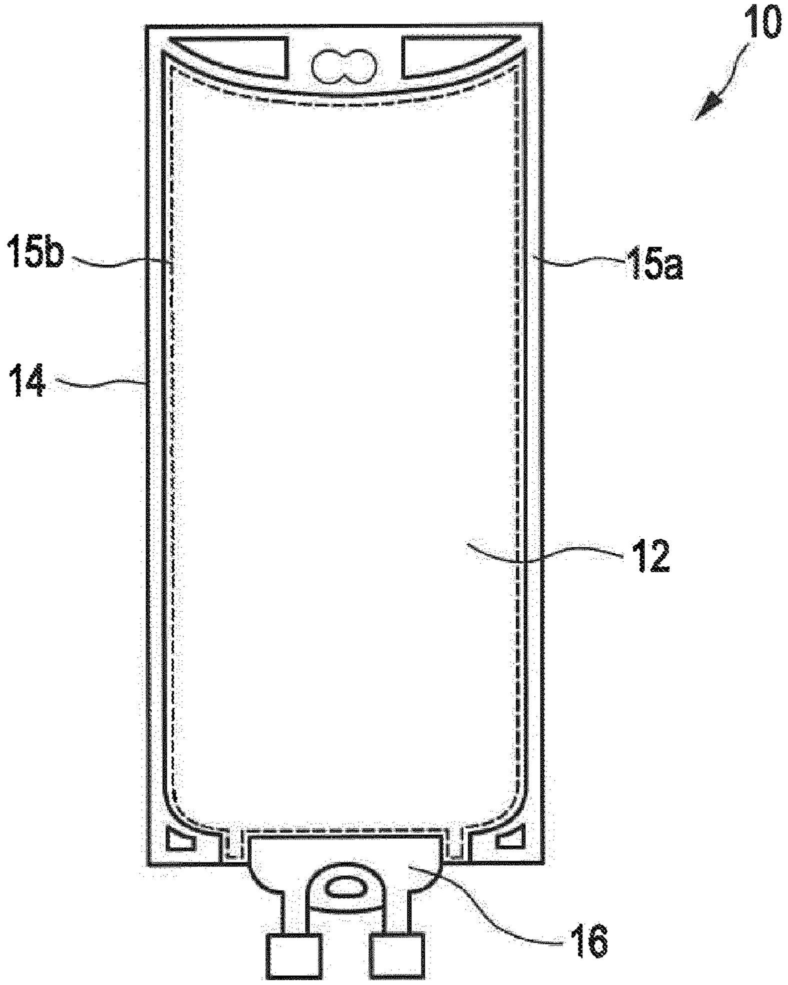

| | | | | |
|---|---|---|---|---|
| 6,673,376 | B1 | 1/2004 | Knerr et al. | |
| 6,689,393 | B1 | 2/2004 | Knerr | |
| 2006/0118433 | A1 * | 6/2006 | Nishio | A61J 1/2093 206/213.1 |
| 2007/0265593 | A1 * | 11/2007 | Kitagawa | A61M 1/1686 604/403 |

FOREIGN PATENT DOCUMENTS

| | | | | |
|---|---|---|---|---|
| CN | 203107694 | U | 8/2013 | |
| CN | 203107696 | U * | 8/2013 | |
| CN | 203139110 | U1 | 8/2013 | |
| CN | 203609657 | U | 5/2014 | |
| CN | 104107140 | A1 | 10/2014 | |
| CN | 105030534 | A | 11/2015 | |
| CN | 105125402 | A1 | 12/2015 | |
| CN | 206809496 | U | 12/2017 | |
| DE | 19912850 | A1 | 9/2000 | |
| EP | 0776649 | A2 | 6/1997 | |
| EP | 0909555 | A1 | 4/1999 | |
| EP | 2085420 | A1 | 8/2009 | |
| EP | 2322236 | A1 | 5/2011 | |
| EP | 3053597 | A1 * | 8/2016 | A61K 33/00 |
| EP | 3295916 | A1 | 3/2018 | |
| JP | H05261141 | A | 10/1993 | |
| JP | H06105905 | A | 4/1994 | |
| JP | H10272168 | A | 10/1998 | |
| JP | H10277132 | A | 10/1998 | |
| JP | H114872 | A | 1/1999 | |
| JP | H11139461 | A1 | 5/1999 | |
| JP | 3112358 | U | 8/2005 | |
| JP | 2006315718 | A | 11/2006 | |
| JP | 201573748 | A | 4/2015 | |
| TW | I623310 | B | 5/2018 | |
| WO | 0117534 | A1 | 3/2001 | |
| WO | 2008059895 | A1 | 5/2008 | |
| WO | 2014177143 | A1 | 11/2014 | |

OTHER PUBLICATIONS

Search Report received in International Application No. PCT/EP2020/060669 dated Jun. 29, 2020, 5 pages.

Written Opinion received in International Application No. PCT/EP2020/060669 dated Jun. 29, 2020, 5 pages.

Search Report received in European Application No. 20 717 693.4-1113 dated Jun. 19, 2024, 7 pages.

* cited by examiner

FIG. 1
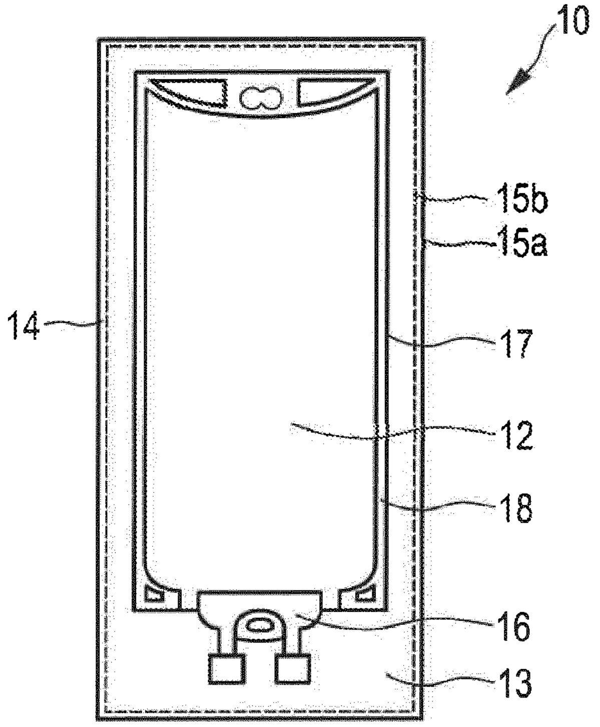
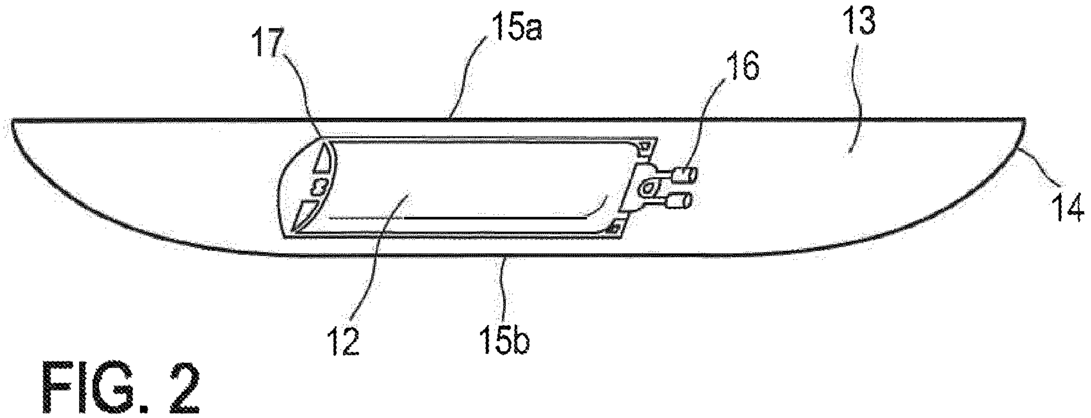
FIG. 2

MEDICINAL PRODUCT COMPRISING A CONTAINER AND AN AQUEOUS LIQUID CONTAINING BICARBONATE

CROSS-REFERENCE TO RELATED APPLICATIONS

This application is the United States national phase entry of International Application No. PCT/EP2020/060669, filed Apr. 16, 2020, and claims the benefit of priority of European Application No. 19170164.8, filed Apr. 18, 2019. The contents of International Application No. PCT/EP2020/060669 and European Application No. 19170164.8 are incorporated by reference herein in their entireties.

FIELD

The present invention relates to a medicinal product comprising a container and an aqueous liquid which contains bicarbonate.

BACKGROUND

Sodium bicarbonate solutions as drug products already exist either for acidosis indication or for dialysis treatment.

For example, a bicarbonate solution for haemodialysis or peritoneal dialysis is known from DE 199 12 850 A1. The bicarbonate solution forms part of a solution system consisting in total of three individual solutions. The solution system is stored in a multi-chamber bag. The bicarbonate solution contains bicarbonate in a maximum concentration of 10 mmol/l. Thus, the carbon dioxide pressure inside the chamber housing the bicarbonate solution can be minimized.

A multi-chamber container containing a dialysis or infusion solution comprising an alkaline reacting bicarbonate component and an acid reacting component is known from U.S. Pat. No. 6,673,376 B1. The acid reacting component may be citric acid, succinic acid, malic acid, or the like.

A two-part dialysis solution is known from EP 2 322 236 A1. The dialysis solution comprises a first component comprising a bicarbonate concentrate and a second component comprising an electrolyte concentrate. A multi-chamber container can be used to house the separate components of the solution.

WO 01/17534 A1 discloses a two-part bicarbonate solution comprising an alkaline bicarbonate concentrate having a pH ranging from about 8.6 to 10.0.

WO 2014/177143 A1 refers to an infusion solution for use as a blood plasma expander. The solution contains exclusively 135 mmol/l to 145 mmol/l of sodium ions and exclusively ≤100 mmol/l of chloride ions, wherein the anions needed to compensate for the cation content are supplemented by bicarbonate ions.

Conventional bicarbonate solutions often suffer from the withdrawal of having non-physiological high pH values.

A severe problem arises from the lack of stability of bicarbonate in aqueous solution due to carbon dioxide loss when stored in semipermeable containers like plastic bags. If the resulting carbon dioxide from the bicarbonate equilibrium in aqueous solution is able to escape a container, the chemical equilibrium moves towards carbonate compound which will increase the pH of the solution towards non-physiological values and form precipitations with any cations present in the solution. For example, if calcium ions are present in solution, the following chemical equilibrium applies:

$$2HCO_3^- + Ca^{2+} \rightleftharpoons CaCO_3 + CO_2 + H_2O$$

To address this stability problem, electrolyte infusion solutions have been developed which contain metabolizable anions like acetate, lactate, gluconate, malate, or the like instead of bicarbonate. The metabolizable anions are oxidized in the liver to produce finally bicarbonate compound. However, these solutions suffer from the withdrawal that bicarbonate is not directly available as treatment agent.

SUMMARY

The object underlying the present invention is therefore to make available a medicinal product comprising an aqueous liquid which contains bicarbonate, wherein the medicinal product at least partially avoids withdrawals of conventional products and is in particular able to house or store a stable ready-to-use or ready-to-infuse liquid containing bicarbonate over a prolonged period of time.

The medicinal product according to the present invention is in particular a sterile medicinal product.

The medicinal product comprises a container, in particular a flexible, i.e. pliable or soft, container, and an aqueous liquid, in particular an aqueous solution. Particularly, the container may be a bag or pouch. Preferably, the container is a mono-chamber container, in particular a mono-chamber bag or pouch. More preferably, the container is a flexible mono-chamber container, in particular a flexible mono-chamber bag or pouch.

The aqueous liquid, in particular aqueous solution, contains bicarbonate and has a physiological pH value (pH level).

The container comprises a first side wall and a second side wall, wherein the first side wall comprises or consists of a barrier material and/or the second side wall comprises or consists of a barrier material.

Preferably, the barrier material is capable of preventing or retarding escape of carbon dioxide from the container and/or intake of carbon dioxide into the container such that the pH-value of the aqueous liquid is maintained or substantially maintained during a shelf life, i.e. storage time, at room temperature of the medicinal product for at least 12 months.

The term "medicinal product" as used according to the present invention may be understood as a medicinal combination or medicinal system comprising a container and an aqueous liquid, in particular aqueous solution, as defined in the preceding paragraphs. With regard to preferred embodiments of both the medicinal product and the aqueous liquid, in particular aqueous solution, reference is made in its entirety to the following description.

The term "aqueous liquid containing bicarbonate" as used according to the present invention refers to a liquid which contains water and bicarbonate and optional additional electrolytes and/or ions, preferably as disclosed in the following description. Accordingly, the term "aqueous solution containing bicarbonate" as used according to the present invention refers to a solution which contains water and bicarbonate and optional additional electrolytes and/or ions, preferably as disclosed in the following description.

The term "mono-chamber container" or "mono-compartment container" as used according to the present invention refers to a container which comprises only one chamber or compartment. The mono-chamber container and mono-compartment container, respectively may be in particular in the form of a mono-chamber (mono-compartment) bag or pouch, in particular flexible, i.e. pliable or soft, mono-chamber (mono-compartment) bag or pouch.

The term "barrier material" as used according to the present invention refers to a material which is capable of retarding and/or preventing diffusion or escape of carbon dioxide from the medicinal product and/or a part thereof, in particular from the container, and/or which is capable of retarding and/or preventing diffusion or intake of carbon dioxide into the medicinal product and/or a part thereof, in particular into the container.

Further, the term "barrier material" as used according to the present invention may refer to one, i.e. a single, type of barrier material or to a combination, in particular mixture, of different barrier materials. As regards useful barrier materials, reference is made to the following description in its entirety.

The term "physiological pH value" in the context of the aqueous liquid, in particular aqueous solution, means a pH value of 6.5 to 7.8, in particular 6.8 to 7.6, preferably 7.0 to 7.5.

The term "substantially maintained" in the context of the pH-value of the aqueous liquid, in particular aqueous solution, as used according to the present invention preferably means a pH-value fluctuation, in particular pH-value increase, of at most 0.8 pH units (units of pH value), in particular 0.1 pH units to 0.6 pH units, preferably 0.1 pH units to 0.5 pH units, during shelf life at room temperature of the medicinal product.

The term "room temperature" as used according to the present invention refers to a temperature of 10° C. to 30° C., preferably 15° C. to 30° C., more preferably 15° C. to 25° C.

The term "bicarbonate" as used according to the present invention refers to hydrogen carbonate ion, i.e. an anion having the formula $HCO_3^-$.

The term "sodium" as used according to the present invention refers to a monovalent sodium ion, i.e. a cation having the formula $Na^+$.

The term "potassium" as used according to the present invention refers to a monovalent potassium ion, i.e. a cation having the formula $K^+$.

The term "calcium" as used according to the present invention refers to a divalent calcium ion, i.e. a cation having the formula $Ca^{2+}$.

The term "magnesium" as used according to the present invention refers to a divalent magnesium ion, i.e. a cation having the formula $Mg^{2+}$.

The "water vapor transmission rate", also abbreviated as "WVTR", as used according to the present invention may be determined by ASTM F1249 or ISO 15106.

The "oxygen transmission rate", also abbreviated as "OTR", as used according to the present invention may be determined by ASTM D3985 or ISO 15105. The present invention is in particular featured by the following advantages:

- Due to the barrier material, diffusion or escape of carbon dioxide from the container, and thus from the medicinal product and/or diffusion or intake of carbon dioxide into the container, and thus into the medicinal product may be prevented or at least significantly retarded or reduced. This results either in no formation or at least considerably retarded or reduced formation of precipitations such as calcium carbonate and/or magnesium carbonate and/or (other) visible particles in the aqueous liquid, in particular aqueous solution. Thus, the chemical and physical stability of the aqueous liquid, in particular aqueous solution, can be increased to a noteworthy extent. Thus, a considerably prolonged shelf life, in particular for at least two years, at room temperature, of the medicinal product, and thus of the aqueous liquid, in particular aqueous solution, containing bicarbonate may be advantageously achieved.
- Further, due to prevention or retardation of carbon dioxide diffusion or escape from the container and/or carbon dioxide diffusion or intake into the container, a pH shift to non-physiological values of the aqueous liquid, in particular aqueous solution, can be circumvented.
- Furthermore, due to the prevention or retardation of precipitation and/or the formation of (other) visible particles in the aqueous liquid, in particular aqueous solution, the medicinal product is advantageously also in accordance with regulatory requirements.
- Altogether, the medicinal product according to the present invention provides a stable and directly available, i.e. ready-to-use or ready-to-infuse, aqueous liquid, in particular aqueous solution, containing bicarbonate which may be closely adapted to human blood plasma and exhibits physiological pH values.
- Furthermore, the medicinal product according to the present invention provides a ready-to use aqueous liquid, in particular aqueous solution, which does not require mixture of different components of a multi-chamber bag as it is, by way of example, described in U.S. Pat. No. 6,673,376 B1.
- Additionally, the medicinal product may be advantageously sterilisable, in particular by autoclaving.

Preferably, the barrier material has a water vapor transmission rate (WVTR)≤3.0 g $m^{-2}$ $day^{-1}$, in particular <3.0 g $m^{-2}$ $day^{-1}$. More preferably, the barrier material has a water vapor transmission rate from 3 g $m^{-2}$ $day^{-1}$ to 0 g $m^{-2}$ $day^{-1}$, in particular 2 g $m^{-2}$ $day^{-1}$ to 0 g $m^{-2}$ $day^{-1}$, preferably 1 g $m^{-2}$ $day^{-1}$ to 0 g $m^{-2}$ $day^{-1}$. The water vapor transmission rates as disclosed in this paragraph are especially useful for reducing/retarding or preventing diffusion or escape of carbon dioxide from the container, and thus from the medicinal product and/or diffusion or intake of carbon dioxide into the container, and thus into the medicinal product.

Alternatively or in combination, the barrier material preferably has an oxygen transmission rate (OTR)≤0.5 g $m^{-2}$ $day^{-1}$, in particular <0.5 g $m^{-2}$ $day^{-1}$. More preferably, the barrier material has an oxygen transmission rate from 0.5 g $m^{-2}$ $day^{-1}$ to 0 g $m^{-2}$ $day^{-1}$, in particular 0.2 g $m^{-2}$ $day^{-1}$ to 0 g $m^{-2}$ $day^{-1}$, preferably 0.1 g $m^{-2}$ $day^{-1}$ to 0 g $m^{-2}$ $day^{-1}$. The oxygen transmission rates as disclosed in this paragraph are especially useful for reducing/retarding or preventing diffusion or escape of carbon dioxide out of the medicinal product.

In particular, the container may be completely impermeable for carbon dioxide.

In an embodiment of the invention, the pH-value of the aqueous liquid, in particular aqueous solution, is maintained or substantially maintained during a shelf life at room temperature of the medicinal product for at least 24 months, in particular at least 30 months, preferably at least 36 months. Particularly, the pH-value of the aqueous liquid, in particular aqueous solution, can be advantageously maintained or substantially maintained during a shelf life at room temperature of the medicinal product for 24, 30 or 36 months.

In a further embodiment of the invention, the pH-value of the aqueous liquid, in particular aqueous solution, does not exceed a pH-value of 7.8, in particular 7.6, preferably 7.5. Preferably, the aqueous liquid, in particular aqueous solution, has a pH-value of 6.5 to 7.8, in particular 6.8 to 7.6, more preferably 7.0 to 7.5, during the shelf life at room temperature of the medicinal product.

In a further embodiment of the invention, the first side wall and the second side wall of the container are arranged opposite each other, in particular in wall thickness direction. Preferably, the first side wall and the second side wall are connected, more preferably cohesively connected, for example bonded, glued or welded, at the edges, thereby forming a storage volume or storage cavity. The storage volume and storage cavity, respectively is preferably adapted to store a further container (so to speak an inner container) which preferably directly, i.e. immediately, surrounds or encases the aqueous liquid, in particular aqueous solution, or may be adapted to directly, i.e. immediately, store the aqueous liquid, in particular aqueous solution. Thus, preferably, the storage volume and storage cavity, respectively may also be denotated as reservoir volume within the scope of the present invention. With respect to further features and advantages of an optional further container (inner container) of the medicinal product, reference is made in its entirety to the following description.

In a further embodiment of the invention, the first side wall and the second side wall of the container comprise or consist of the same barrier material. As regards useful barrier material, reference is made in its entirety to the following description.

In a further embodiment of the invention, the first side wall and the second side wall of the container comprise or consist of a different barrier material. As regards useful barrier materials reference is also made in its entirety to the following description.

It is preferably within the scope of the present invention that the barrier material may be a transparent material or at least a partially transparent material. The term "transparent material" as used according to the present invention refers to a material which is transparent to visible light, i.e. light having wavelengths in the range from 400 nm to 700 nm. Accordingly, the term "partially transparent material" as used according to the present invention refers to a material which is only partially transparent to visible light, i.e. light having wavelengths in the range from 400 nm to 700 nm. A transparent or at least partially transparent barrier material advantageously allows inspection of the aqueous liquid, in particular aqueous solution, in terms of non-soluble or poorly soluble compounds such as calcium carbonate, magnesium carbonate and/or (other) visible particles. Thus, an efficient control in terms of any destabilization processes is possible which might impair the quality of the aqueous liquid, in particular aqueous solution. As regards useful transparent or partially transparent barrier materials, reference is made to the following described barrier materials.

Further, the barrier material may be a thermoformable material. Such a material may ease the production of the container and thus of the medicinal product. As regards useful thermoformable barrier materials, reference is made to the following described barrier materials.

Further, the barrier material may be a weldable material. Such a material may also ease the production of the container and thus of the medicinal product, in particular by welding the first side wall and the second side wall along facingly arranged peripheral surface areas. As regards useful weldable barrier materials, reference is made to the following described barrier materials.

Further, the barrier material may be a retortable material. Such a material advantageously allows sterilization of the medicinal product, in particular of the aqueous liquid, in particular aqueous solution. As regards useful retortable barrier materials, reference is made to the following described barrier materials.

Further, the barrier material may be generated or produced by means of chemical vapour deposition (CVD), in particular plasma-assisted or plasma-enhanced chemical vapour deposition (PECVD). An accordingly produced barrier material may advantageously contribute to or result in a wall having a small thickness, thereby facilitating or improving flexibility of the container. As regards barrier materials which are producible by means of chemical vapour deposition, reference is made to the following described barrier materials.

An advantage of plasma-assisted or plasma-enhanced chemical vapour deposition is the low heat load to a substrate and the relatively short process time for generating a thin layer of the barrier material.

A plasma-assisted or plasma-enhanced chemical vapour deposition may be, for instance, conducted by placing an empty container into a vacuum chamber and to vacuum the chamber. Afterwards, a material gas may be supplied into the container to apply electromagnetic wave to the inside of the container so that the material gas is decomposed into a plasma state. Afterwards, the plasma is allowed to form a film, i.e. a thin layer, on an inner wall surface of the container. Finally, the chamber is released to atmospheric pressure and the coated container is removed from the vacuum chamber.

In a further embodiment of the invention, the barrier material is selected from the group consisting of metal oxide, silicon oxide, metal, carbon such as diamond-like carbon, metal nitride, plastic material and combinations, in particular blends, composites or laminates, of at least two of said barrier materials.

Preferably, the metal oxide is aluminium oxide. More preferably, aluminium oxide has the formula $AlO_x$.

The silicon oxide, as used according to the present invention, has preferably the formula $SiO_x$, wherein x is preferably 1.9 to 2.0.

It surprisingly turned out that silicon oxide is an especially useful barrier material for providing a stabilized ready-to-use or ready-to-infuse aqueous liquid, in particular stabilized ready-to-use or ready-to-infuse aqueous solution, containing bicarbonate. In addition, silicon oxide advantageously allows formation of a transparent wall of the container. The silicon oxide may be in particular generated or produced by means of chemical vapour deposition, preferably plasma-assisted or plasma-enhanced chemical vapour deposition, in particular by using a precursor compound such as hexamethyldisiloxane and/or hexamethyldisilazane. As regards further features and advantages of chemical vapour deposition, reference is made in its entirety to the previous description.

Further, the metal mentioned as a possible barrier material is preferably aluminium, i.e. elementary or non-oxidized aluminium. Aluminium as barrier material has the advantage that it facilitates formation of a thermoformable container wall.

Further, it has been surprisingly turned out that diamond-like carbon (DLC) is a further suitable barrier material for providing a stabilized ready-to-use or ready-to-infuse aqueous liquid, in particular stabilized ready-to-use or ready-to-infuse aqueous solution, containing bicarbonate. In addition, diamond-like carbon advantageously allows formation of a transparent and thermoformable wall of the container.

Diamond-like carbon (DLC) is an amorphous carbon material which exhibits some of the typical characteristics of diamond. Diamond-like carbon contains significant amounts of spa hybridized carbon atoms. In particular, the diamond-like carbon may have a form, wherein the carbon atoms are arranged in a cubic or hexagonal lattice. Further, the diamond-like carbon may be in the form of tetrahedral amorphous carbon which is the result of mixing the afore-described forms (polytypes) of diamond-like carbon. Principally, diamond-like carbon may be manufactured by processes in which high energy precursive carbons are rapidly cooled or quenched on relatively cold surfaces. For example, diamond-like carbon may be produced in plasmas, in filtered cathodic arc deposition, in sputter deposition or ion beam deposition. In these processes, cubic and hexagonal lattices can be generated and randomly intermixed, layer by atomic layer, since there is no time available for one of the crystalline geometries to grow at the expense of the other before the atoms are "frozen" in place in the material. Amorphous diamond-like carbon coatings can result in materials that have no long-range crystalline order. Without long-range order, there are no brittle fracture planes, so such coatings are flexible and conformal to the underlying shape being coated, while still being as hart as diamond.

In particular, the diamond-like carbon may be generated or produced by means of chemical vapour deposition, preferably plasma-assisted or plasma-enhanced chemical vapour deposition, in particular by using a precursor compound such as acetylene ($C_2H_2$). As regards further features and advantages of chemical vapour deposition, reference is made in its entirety to the previous description.

Further, the plastic material mentioned as a possible barrier material is in particular selected from the group consisting of ethylene vinyl alcohol, polyvinyl alcohol, polyvinylidene chloride, thermoplastic material of the phenoxy type, phenoxy polyolefin, polyamide, polyacrylonitrile, modified cellulose such as hydroxylpropyl cellulose and combinations, in particular blends, composites or laminates, of at least two of said plastic materials.

The term "ethylene vinyl alcohol" (EVOH) as used according to the present invention refers to a copolymer of ethylene and vinyl alcohol, i.e. to a copolymer which is available by polymerization of the monomers ethylene and vinyl alcohol.

The polyamide is preferably a polyamide which is available by polycondensation of m-xylenediamine with adipic acid. Such a polyamide is commercially available under the notation "Nylon-MXD6".

Accordingly, it is especially preferred that the barrier material is selected from the group consisting of aluminium oxide, silicon oxide, aluminium, diamond-like carbon, ethylene vinyl alcohol, polyvinyl alcohol, polyvinylidene chloride, thermoplastic material of the phenoxy type, phenoxy polyolefin, polyamide, polyacrylonitrile, modified cellulose such as hydroxylpropyl cellulose and combinations, in particular blends, composites or laminates, of at least two of said barrier materials.

As already mentioned, the first side wall and the second side wall of the container may preferably comprise or consist of a different barrier material. More Preferably, the barrier material of the first side wall and the barrier material of the second side wall are independently selected from the group consisting of aluminium oxide, silicon oxide, aluminium, diamond-like carbon, ethylene vinyl alcohol, polyvinyl alcohol, polyvinylidene chloride, thermoplastic material of the phenoxy type, phenoxy polyolefin, polyamide, polyacrylonitrile, modified cellulose such as hydroxylpropyl cellulose and combinations, in particular blends, composites or laminates, of at least two of said barrier materials. With regard to further useful barrier materials reference is made in its entirety to the previous description.

Further, as also already mentioned, the first side wall and the second side wall of the container may preferably comprise or consist of the same barrier material. More preferably, the barrier material is selected from the group consisting of aluminium oxide, silicon oxide, diamond-like carbon and a combination, in particular composite or laminate, thereof. Especially preferably, the barrier material is aluminium oxide and/or silicon oxide.

In a further embodiment of the invention, the barrier material of the first side wall is selected from the group consisting of aluminium oxide, silicon oxide and a combination, in particular composite or laminate, thereof and the barrier material of the second side wall is aluminium.

In a further embodiment of the invention, the barrier material of the first side wall and the barrier material of the second side wall is selected from the group consisting of aluminium oxide, silicon oxide and a combination, in particular composite or laminate, thereof.

In a further embodiment of the invention, the barrier material of the first side wall and the barrier material of the second side wall is diamond-like carbon.

In a further embodiment of the invention, the barrier material of both the first side wall and the second side wall is silicon oxide and both the first side wall and the second side wall additionally comprise a polyolefin, in particular polypropylene and/or polyethylene. Preferably, the silicon oxide is in the form of a coating.

In a further embodiment of the invention, the barrier material of both the first side wall and the second side wall is aluminium oxide and both the first side wall and the second side wall additionally comprise a polyolefin, in particular polypropylene and/or polyethylene. Preferably, the aluminium oxide is in the form of a coating.

In a further embodiment of the invention, the barrier material of both the first side wall and the second side wall is aluminium (i.e. elemental or metallic aluminium) and both the first side wall and the second side wall additionally comprise a polyolefin, in particular polypropylene and/or polyethylene. Preferably, the aluminium is in the form of a foil.

In a further embodiment of the invention, the barrier material of both the first side wall and the second side wall is ethylene vinyl alcohol and both the first side wall and the second side wall additionally comprise a polyolefin, in particular polypropylene and/or polyethylene such as low density polyethylene.

In a further embodiment of the invention, the first side wall and/or the second side wall have/has a single-layered or multilayered, in particular double-layered, three-layered or four-layered, structure. More specifically, an upper or top layer of the multilayered, in particular double-layered, three-layered or four-layered, structure and a lower or lowest layer of the multilayered, in particular double-layered, three-layered or four-layered, structure may preferably comprise or consist of a different barrier material. Alternatively, an upper or top layer of the multilayered, in particular double-layered, three-layered or four-layered, structure and a lower or lowest layer of the multilayered, in particular double-layered, three-layered or four-layered, structure may preferably comprise or consist of the same barrier material. Principally, the barrier material of the upper or top layer of the structure and the barrier material of the lower or lowest layer of the structure may be independently selected from a barrier material as disclosed in the previous description.

The term "upper layer" or "top layer" in the context of a multilayered first side wall and/or multilayered second side wall of the container as used according to the present invention refers to a layer which is arranged at the outside of the container. In particular, the upper or top layer can be in the form of a coating or film.

The term "lower layer" or "lowest layer" in the context of a multilayered first side wall and/or multilayered second side wall as used according to the present invention refers to a layer which is arranged at the inside of the container. In particular, the lower or lowest layer can be in the form of a coating or film.

In a further embodiment of the invention, the first side wall and/or the second side wall have/has a multilayered, in particular double-layered, three-layered or four-layered, structure, wherein an upper or top layer of the structure comprises or consists of aluminium oxide and a lower or lowest layer of the structure comprises or consists of silicon oxide or vice versa, i.e. an upper or top layer of the structure comprises or consists of silicon oxide and a lower or lowest layer of the structure comprises or consists of aluminium oxide.

In a further embodiment of the invention, the first side wall has a multilayered, in particular double-layered, three-layered or four-layered, structure, wherein an upper or top layer of the structure comprises or consists of aluminium oxide and/or a lower or lowest layer of the structure comprises or consists of silicon oxide or vice versa, i.e. an upper or top layer of the structure comprises or consists of silicon oxide and a lower or lowest layer of the structure comprises or consists of aluminium oxide and wherein the second side wall, in particular having a single-layered structure, comprises or consists of aluminium.

In a further embodiment of the invention, the first side wall and/or the second side wall of the container have/has a single-layered or multilayered, in particular double-layered, three-layered or four-layered, structure comprising or consisting of a polyolefin, in particular polypropylene and/or polyethylene, and additionally have/has a layer, in particular coating, comprising or consisting of silicon oxide.

In a further embodiment of the invention, the first side wall and/or the second side wall of the container have/has a single-layered or multilayered, in particular double-layered, three-layered or four-layered, structure comprising or consisting of a polyolefin, in particular polypropylene and/or polyethylene, and additionally have/has a layer, in particular coating, comprising or consisting of aluminium oxide.

In a further embodiment of the invention, the first side wall and/or the second side wall of the container have/has a single-layered or multilayered, in particular double-layered, three-layered or four-layered, structure comprising or consisting of a polyolefin, in particular polypropylene and/or polyethylene, and additionally have/has a layer, in particular foil, comprising or consisting of aluminium (i.e. elemental or metallic aluminium).

In a further embodiment of the invention, the first side wall and/or the second side wall of the container have/has a thickness below 500 μm, in particular from 25 μm to 300 μm, preferably 25 μm to 50 μm or 50 μm to 300 μm. The wall thicknesses as disclosed in this paragraph are especially advantageous in terms of flexibility and optimized barrier properties of the container. Further, a wall having a thickness as disclosed in this paragraph may also be denoted as a film according to the present invention.

Principally, it may be within the scope of the present invention that the medicinal product does not comprise any further container. In other words, the medicinal product may only comprise a single container, namely a container as disclosed in the previous description. In that case, the aqueous liquid, in particular aqueous solution, is preferably contained, i.e. stored or housed, in particular completely and/or directly, i.e. immediately, contained, i.e. stored or housed, in the (single) container.

In a further and especially preferred embodiment of the invention, the container is an outer container, i.e. is in the form of an outer container, and the medicinal product further comprises an inner container, in particular a flexible, i.e. pliable or soft, inner container, which is encased or surrounded, in particular completely and/or directly, i.e. immediately, encased or surrounded, by the outer container. Particularly, the inner container may be a bag or pouch. Preferably, the inner container is a mono-chamber container, in particular a mono-chamber bag or pouch. More preferably, the inner container is a flexible mono-chamber container, in particular a flexible mono-chamber bag or pouch.

According to the present invention, the inner container may be denoted as primary container, in particular primary bag or pouch, while the outer container may be denoted as secondary container, in particular secondary bag or pouch. Further, the inner container and outer container may be also denoted as a container system according to the present invention.

Preferably, the aqueous liquid, in particular aqueous solution, is contained, i.e. stored or housed, in particular completely and/or directly, i.e. immediately, contained, i.e. stored or housed, in the inner container. In other words, preferably, the aqueous liquid, in particular aqueous solution, is surrounded or encased, in particular completely and/or directly, i.e. immediately, surrounded or encased, by the inner container.

Further, the inner container may have a wall thickness from 25 μm to 300 μm.

In a further embodiment of the invention, the inner container has a wall comprising or consisting of a wall material, in particular of a barrier material which is capable of preventing or retarding escape of carbon dioxide from the inner container and/or intake of carbon dioxide into the inner container, in particular such that the pH-value of the aqueous liquid is maintained or substantially maintained during a shelf life at room temperature of the medicinal product for at least 12 months, in particular at least 24 months, in particular at least 30 months, preferably at least 36 months.

Preferably, the wall material is selected from the group consisting of metal oxide such as aluminium oxide, silicon oxide, metal such as aluminium, carbon such as diamond-like carbon, plastic material such as polyolefin, polyethylene, low density polyethylene, high density polyethylene, polypropylene, polyethylene terephthalate, polyacrylonitrile, ethylene vinyl alcohol, polyvinyl alcohol, polyvinylidene chloride, thermoplastic material of the phenoxy type, phenoxy polyolefin, polyamide, modified cellulose such as hydroxypropyl cellulose and combinations, in particular blends, composites or laminates, of at least two of said barrier materials.

The wall material of the inner container can be different from the barrier material of the outer container. Alternatively, the wall material of the inner container can be the same material as the barrier material of the outer container.

In particular, the wall material of the inner container and the barrier material of the outer container may be independently selected from the group consisting of metal oxide such as aluminium oxide, silicon oxide, metal such as aluminium, carbon such as diamond-like carbon, plastic material such as polyolefin, polyethylene, low density polyethylene, high density polyethylene, polypropylene, polyethylene terephthalate, polyacrylonitrile, ethylene vinyl alcohol, polyvinyl alcohol, polyvinylidene chloride, thermoplastic material of the phenoxy type, phenoxy polyolefin, polyamide, modified cellulose such as hydroxypropyl cellulose and combinations, in particular blends, composites or laminates, of at least two of said barrier materials.

Preferably, the inner container has a single-layered or multilayered, in particular double-layered, three-layered or four-layered, wall. More preferably, an upper or top layer of the wall and a lower or lowest layer of the wall comprise or consist of a different wall material. Alternatively, an upper or top layer of the wall and a lower or lowest layer of the wall may comprise or consist of the same wall material. Principally, the wall material of the upper or top layer and the wall material of the lower or lowest layer may be independently selected from a wall material as disclosed in the preceding paragraphs. More preferably, an upper or top layer of the wall of the inner container comprises or consists of polyolefin such as polyethylene and a lower or lowest layer of the wall of the inner container comprises or consists of polyethylene terephthalate or vice versa. Alternatively, an upper or top layer of the wall of the inner container may preferably comprise or consist of aluminium oxide and a lower or lowest layer of the wall of the inner container may preferably comprise or consist of silicon oxide or vice versa.

The term “upper layer” or “top layer” in the context of a multilayered wall of the inner container as used according to the present invention refers to a layer which is arranged at the outside of the inner container. In particular, the upper or top layer can be in the form of a coating or film. The term “lower layer” or “lowest layer” in the context of a multilayered wall of the inner container as used according to the present invention refers to a layer which is arranged at the inside of the inner container. In particular, the lower or lowest layer can be in the form of a coating or film.

Preferably, the wall material of the inner container comprises or consists of a polyolefin, in particular polypropylene and/or polyethylene, and the first side wall and/or second side wall of the outer container comprises or consists of silicon oxide or a combination of a polyolefin, in particular polypropylene and/or polyethylene, and silicon oxide.

Further, it may be preferred that the wall material of the inner container comprises or consists of a polyolefin, in particular polypropylene and/or polyethylene, and the barrier material of the outer container comprises or consists of ethylene vinyl alcohol.

Further, it may be preferred that the wall material of the inner container and the barrier material of the outer container comprise or consist of silicon oxide.

Further, it may be preferred that the wall material of the inner container comprises or consists of a polyolefin, in particular polypropylene and/or polyethylene, and silicon oxide and the first side wall and/or second side wall of the outer container also comprises or consists of a polyolefin, in particular polypropylene and/or polyethylene, and silicon oxide.

Further, it may be preferred that the wall material of the inner container comprises or consists of a polyolefin, in particular polypropylene and/or polyethylene, and the first side wall and/or second side wall of the outer container comprises or consists of a polyolefin, in particular polyethylene terephthalate and/or polypropylene, aluminium (i.e. elemental or metallic aluminium) and aluminium oxide.

Further, it may be preferred that the wall material of the inner container is a polyolefin, in particular polypropylene and/or polyethylene, and the barrier material of the outer container is diamond-like carbon.

In a further embodiment of the invention, the wall of the inner container has a single-layered or multilayered, in particular double-layered, three-layered or four-layered, structure comprising or consisting of a polyolefin, in particular polypropylene and/or polyethylene, and the first side wall and/or the second side wall of the outer container comprise/comprises or consist/consists of a polyolefin, in particular polypropylene and/or polyethylene, and a layer, in particular coating, comprising or consisting of silicon oxide.

In a further embodiment of the invention, the wall of the inner container has a single-layered or multilayered, in particular double-layered, three-layered or four-layered, structure comprising or consisting of a polyolefin, in particular polypropylene and/or polyethylene, and the first side wall and/or the second side wall of the outer container comprise/comprises or consist/consists of ethylene vinyl alcohol.

In a further embodiment of the invention, the wall of the inner container has a single-layered or multilayered, in particular double-layered, three-layered or four-layered, structure comprising or consisting of a polyolefin, in particular polypropylene and/or polyethylene, and the first side wall and/or the second side wall of the outer container comprise/comprises or consist/consists of a polyolefin, in particular polypropylene and/or polyethylene, and a layer, in particular coating, comprising or consisting of aluminium oxide.

In a further embodiment of the invention, the wall of the inner container has a single-layered or multilayered, in particular double-layered, three-layered or four-layered, structure comprising or consisting of a polyolefin, in particular polypropylene and/or polyethylene, and additionally has a layer, in particular coating, wherein the layer, in particular coating, comprises or consists of silicon oxide, and the first side wall and/or the second side wall of the outer container (also) has a single-layered or multilayered, in particular double-layered, three-layered or four-layered, structure comprising or consisting of a polyolefin, in particular polypropylene and/or polyethylene, and additionally has a layer, in particular coating, wherein the layer, in particular coating, comprises or consists of silicon oxide.

In a further embodiment of the invention, the wall of the inner container has a single-layered or multilayered, in particular double-layered, three-layered or four-layered, structure comprising or consisting of a polyolefin, in particular polypropylene and/or polyethylene, the first side wall of the outer container comprises a polyolefin, in particular polyethylene terephthalate and/or polypropylene, and additionally has a layer, in particular coating, comprising or consisting of aluminium oxide and the second side wall of the outer container has a single-layered or multilayered, in particular double-layered, three-layered or four-layered, structure comprising or consisting of a polyolefin, in particular polypropylene and/or polyethylene, and additionally has a layer, in particular a coating or foil, of aluminium (i.e. elemental or metallic aluminium).

In a further embodiment of the invention, the wall of the inner container has a single-layered or multilayered, in particular double-layered, three-layered or four-layered, structure comprising or consisting of a polyolefin, in particular polypropylene and/or polyethylene, and the first side wall and/or the second side wall of the outer container has a single-layered or multilayered, in particular double-layered, three-layered or four-layered, structure comprising or consisting of diamond-like carbon.

In a further embodiment of the invention, the first side wall of the outer container comprises or consists of aluminium and the second side wall of the outer container comprises or consists of aluminium oxide or silicone oxide or vice versa, i.e. the first side wall of the outer container comprises or consists of aluminium oxide or silicone oxide and the second side wall of the outer container comprises or consists of aluminium.

In other words, according to a further embodiment of the invention, the medicinal product comprises an outer container, preferably a mono-chamber outer container, and an inner container, preferably a mono-chamber inner container, which is encased or surrounded by the outer container, preferably mono-chamber outer container, wherein the first side wall of the outer container, preferably mono-chamber outer container, comprises or consists of aluminium and the second side wall of the outer container, preferably mono-chamber outer container, comprises or consists of aluminium oxide or silicone oxide or vice versa, i.e. wherein the first side wall of the outer container, preferably mono-chamber outer container, comprises or consists of aluminium oxide or silicone oxide and the second side wall of the outer container, preferably mono-chamber outer container, comprises or consists of aluminium.

Further, the medicinal product, in particular the outer container or the inner container, preferably the inner container, may have a suitable outlet, in particular port, for emptying of the aqueous liquid, in particular aqueous solution.

The aqueous liquid, in particular aqueous solution, of the medicinal product is preferably for use in the treatment of liquid losses, in particular extracellular liquid losses, preferably of isotonic dehydration, preferably where acidosis is present or imminent, and/or for use in the dialysis treatment. More preferably, the aqueous liquid, in particular aqueous solution, of the medicinal product is for use in the treatment of liquid losses of humans and/or for use in the dialysis treatment of humans.

Further, the aqueous liquid, in particular aqueous solution, of the medicinal product is preferably adapted or customized for parenteral, in particular intravenous, administration. In other words, the aqueous liquid, in particular aqueous solution, of the medicinal product is preferably administered parenterally, in particular intravenously.

The aqueous liquid, in particular aqueous solution, may contain 10 mmol/l to 40 mmol/l, in particular 20 mmol/l to 35 mmol/l, preferably 24 mmol/l to 35 mmol/l, of bicarbonate. More preferably, the aqueous liquid, in particular aqueous solution, contains 28 mmol/l of bicarbonate.

Further, the aqueous liquid, in particular aqueous solution, may additionally contain 130 mmol/l to 150 mmol/l, in particular 135 mmol/l to 145 mmol/l.

Further, the aqueous liquid, in particular aqueous solution, may additionally contain 0 mmol/l to 5 mmol/l, in particular 0 mmol/l to 4 mmol/l, preferably 4 mmol/l of potassium.

Further, the aqueous liquid, in particular aqueous solution, may additionally contain 0 mmol/l to 2 mmol/l, in particular 0 mmol/l to 1.5 mmol/l, of calcium. In particular, the aqueous liquid, in particular aqueous solution, may be free of calcium.

Further, the aqueous liquid, in particular aqueous solution, may additionally contain 0 mmol/l to 2 mmol/l, in particular 0 mmol/l to 1.5 mmol/l, preferably 0.5 mmol/l to 1.0 mmol/l, of magnesium.

Further, the aqueous liquid, in particular aqueous solution, may additionally contain 90 mmol/l to 150 mmol/l, in particular 95 mmol/l to 125 mmol/l, preferably 100 mmol/l to 120 mmol/l of chloride.

Further, the aqueous liquid, in particular aqueous solution, may be preferably free of acetate and/or lactate.

Further, the aqueous liquid, in particular aqueous solution, may be preferably free of malate.

Further, the aqueous liquid, in particular aqueous solution, may additionally contain 0 mmol/l to 30 mmol/l, in particular 10 mmol/l to 25 mmol/l, preferably 15 mmol/l to 20 mmol/l, of gluconate.

Further, the aqueous liquid, in particular aqueous solution, may additionally contain 0 mmol/l to 10 mmol/l, in particular 0.0 mmol/l to 5 mmol/l, of citrate. In particular, the aqueous liquid, in particular aqueous solution, may be free of citrate.

Further, the aqueous liquid, in particular aqueous solution, may additionally contain not more than 2 mmol/l, in particular 0.1 mmol/l to 2 mmol/l, of phosphate. Preferably, the aqueous liquid, in particular aqueous solution, is free of phosphate.

Further, the aqueous liquid, in particular aqueous solution, may additionally contain 0 mmol/l to 60 mmol/l of glucose. In particular, the aqueous liquid, in particular aqueous solution, may be free of glucose.

Further, the aqueous liquid, in particular aqueous solution, may be preferably free of calcium, acetate, lactate, malate, citrate, phosphate and glucose.

In a further embodiment, the aqueous liquid, in particular aqueous solution, contains 100 to mmol/l to 150 mmol/l of sodium, 0 mmol/l to 5 mmol/l of potassium, 0 mmol/l to 2 mmol/l of calcium, 0 mmol/l to 2 mmol/l of magnesium, 90 mmol/l to 150 mmol/l of chloride, 10 mmol/l to 40 mmol/l of bicarbonate, 0 mmol/l to 30 mmol/l of gluconate, 0 mmol/l to 10 mmol/l of citrate and 0 mmol/l to 60 mmol/l of glucose.

Preferably, the aqueous liquid, in particular aqueous solution, contains 135 mmol/l to 145 mmol/l of sodium, 0 mmol/l to 4 mmol/l of potassium, 0 mmol/l to 1.5 mmol/l of calcium, 0 mmol/l to 1.5 mmol/l of magnesium, 95 mmol/l to 125 mmol/l of chloride, 20 mmol/l to 35 mmol/l of bicarbonate, 10 mmol/l to 25 mmol/l of gluconate, 0 mmol/l to 10 mmol/l of citrate, and 0 mmol/l to 60 mmol/l of glucose.

More preferably, the aqueous liquid, in particular aqueous solution, contains 135 mmol/l to 145 mmol/l of sodium, 4 mmol/l of potassium, 0.5 mmol/l to 1 mmol/l of calcium, 0 mmol/l to 1.5 mmol/l of magnesium, 100 mmol/l to 120 mmol/l of chloride, 24 mmol/l to 35 mmol/l of bicarbonate, 10 mmol/l to 25 mmol/l of gluconate, 0 mmol/l to 5 mmol/l of citrate, and 0 mmol/l to 60 mmol/l of glucose. Further, the aqueous liquid, in particular aqueous solution, may have an experimental osmolarity from 280 mmol/l to 310 mmol/l, in particular 285 mmol/l to 305 mmol/l, preferably 290 mmol/l to 300 mmol/l. The experimental osmolarity of the aqueous liquid, in particular aqueous solution, may be determined by using an osmometer by the means of freezing-point depression.

In a further embodiment of the invention, the container, in particular the outer container, or a wall or wall portion thereof, preferably the first side wall and/or the second side wall thereof, in particular only the first side wall and/or only the second side wall thereof, and/or the inner container or a wall or wall portion thereof are/is transparent and/or thermoformable and/or retortable.

In a further embodiment of the invention, the medicinal product is terminally or thermally sterilized, in particular by autoclaving, Further features and advantages of the invention will become clear from the following description of preferred embodiments in form of figures, figure descriptions and examples. The individual features can be realized either singularly or severally in combination in one embodiment of the invention. The preferred embodiments merely serve for illustration and better understanding of the invention and are not to be understood as in any way limiting the invention.

BRIEF DESCRIPTION OF THE DRAWING FIGURES

The figures schematically show the following:

FIG. 1: a top view of an embodiment of a medicinal product according to the present invention, FIG. 2: a perspective view of the medicinal product as shown in FIG. 1 and FIG. 3: a further embodiment of a medicinal product according to the present invention.

DETAILED DESCRIPTION

FIG. 1 schematically shows a top view of an embodiment of a medicinal product 10 according to the present invention.

The medicinal product 10 comprises an outer container 14 and an inner container 17. The inner container 17 is encased or surrounded, in particular completely and immediately encased or surrounded, by the outer container 14. The inner container 17 contains an aqueous liquid, in particular aqueous solution, 12 containing bicarbonate.

Further, both the outer container 14 and the inner container 17 are preferably in the form of a mono-chamber container, in particular a flexible mono-chamber container.

The outer container 14 comprises a first side wall 15*a* and a second side wall 15*b* (see also FIG. 2). Preferably, both the first side wall 15*a* and the second side wall 15*b* comprise or consist of a barrier material. More preferably, the first side wall 15*a* and the second side wall 15*b* may comprise or consist of a different barrier material. Alternatively, the first side wall 15*a* and the second side wall 15*b* may comprise or consist of the same barrier material.

The first side wall 15*a* and the second side wall 15*b* of the container 14 are preferably arranged opposite each other, in particular in wall thickness direction. More preferably, the first side wall 15*a* and the second side wall 15*b* are connected, especially preferably cohesively connected, for instance bonded, glued or welded, at the edges, thereby forming a storage volume or storage cavity 13. The storage volume and storage cavity 13, respectively is adapted to store the inner container 17.

Preferably, the barrier material has a water vapor transmission rate≤3.0 g $m^{-2}$ $day^{-1}$ and/or an oxygen transmission rate≤0.5 g $m^{-2}$ $day^{-1}$.

Further, the first side wall 15*a* and/or the second side wall 15*b* may have a multilayered, in particular double-layered, three-layered or four-layered, structure, wherein an upper or top layer of the structure and a lower or lowest layer of the structure may preferably differ from each other in terms of the barrier material.

The inner container 17 has a wall 18. The wall 18 may comprise or consist of a wall material which is different from the barrier material. Alternatively, the wall material may comprise or consist of a barrier material (within the scope of the present invention). Further, also the wall 18 of the inner container 17 may have a multilayered, in particular double-layered, three-layered or four-layered, structure comprising an upper or top layer and a lower or lowest layer. Preferably, the upper or top layer of the structure and the lower or lowest layer of the structure differ from each other in terms of the wall material.

More preferably, in case of a multilayered, in particular double-layered, three-layered or four-layered, first side wall 15*a* of the outer container 14, the upper or top layer of the first side wall 15*a* comprises or consists of aluminium oxide and the lower or lowest layer of the first side wall 15*a* comprises or consists of silicon oxide or vice versa. Further, the second side wall 15*b* of the outer container 14 preferably comprises or consists of aluminium. The wall 18 of the inner container 17 preferably comprises or consists of polyolefin such as polyethylene, polyethylene terephthalate or a combination, in particular blend, composite or laminate, thereof. Preferably, in case of a multilayered, in particular double-layered, three-layered or four-layered, wall 18 of the inner container 17, the upper or top layer of wall 18 may comprise or consist of a polyolefin such as polyethylene and the lower or lowest layer of wall 18 may comprise or consist of polyethylene terephthalate or vice versa. Alternatively, it may be preferred that the upper or top layer of the wall 18 comprises or consists of aluminium oxide and the lower or lowest layer of the wall 18 comprises or consists of silicon oxide or vice versa.

Alternatively, both the first side wall 15*a* and the second side wall 15*b* of the outer container 14 may comprise or consist of aluminium oxide and/or silicon oxide. In particular, in case of a multilayered, in particular double-layered, three-layered or four-layered, first side wall 15*a* and multilayered, in particular double-layered, three-layered or four-layered, second side wall 15*b*, the upper or top layer of both the first side wall 15*a* and the second side wall 15*b* may comprise or consist of aluminium oxide and the lower or lowest layer of both the first wall 15*a* and the second wall 15*b* may comprise or consist of silicon oxide or vice versa. The wall 18 of the inner container 17 preferably comprises or consists of polyolefin such as polyethylene, polyethylene terephthalate or a combination, in particular blend, composite or laminate, thereof. Preferably, in case of a multilayered, in particular double-layered, three-layered or four-layered, wall 18 of the inner container 17, the upper or top layer of the wall 18 may comprise or consist of a polyolefin such as polyethylene and the lower or lowest layer of the wall 18 may comprise or consist of polyethylene terephthalate or vice versa. Alternatively, it may be preferred that the upper or top layer of the wall 18 comprises or consists of aluminium oxide and the lower or lowest layer of the wall 18 comprises or consists of silicon oxide or vice versa.

Alternatively, both the first side wall 15*a* and the second side wall 15*b* of the outer container 14 preferably comprise or consist of diamond-like carbon. The wall 18 of the inner container 17 preferably comprises or consists of polyolefin such as polyethylene, polyethylene terephthalate or a combination, in particular blend, composite or laminate, thereof. Preferably, in case of a multilayered, in particular double-layered, three-layered or four-layered, wall 18 of the inner container 17, the upper or top layer of the wall 18 may comprise or consist of a polyolefin such as polyethylene and the lower or lowest layer of the wall 18 may comprise or consist of polyethylene terephthalate or vice versa.

Further, the inner container 17 may comprise a port 16 for emptying of the aqueous liquid, in particular aqueous solution, 12 out of the container 17.

Preferably, the aqueous liquid, in particular aqueous solution, 12 contains 100 mmol/l to 150 mmol/l of sodium, 0 mmol/l to 5 mmol/l of potassium, 0 mmol/l to 2 mmol/l of calcium, 0 mmol/l to 2 mmol/l of magnesium, 90 mmol/l to 150 mmol/l of chloride, 25 mmol/l to 32 mmol/l of bicarbonate, 0 mmol/l to 30 mmol/l of gluconate, 0 mmol/l to 10 mmol/l of citrate, 0 mmol/l to 2 mmol/l of phosphate and 0 mmol/l to 60 mmol/l of glucose.

Further, the aqueous liquid, in particular aqueous solution, 12 may have a pH value of 6.5 to 7.8, in particular 6.8 to 7.6, preferably 7.0 to 7.5. These pH values have the advantage that they represent physiological pH values of the blood plasma.

The medicinal product 10 has the advantage that any diffusion or escape of carbon dioxide from the outer container 14, and thus from the medicinal product 10, in particular caused by a carbon dioxide permeable material of the port 16 of the inner container 17, and/or intake of carbon dioxide into the outer container 14, and thus into the medicinal product 10 can be advantageously circumvented or at least retarded. This additionally increases stability of the aqueous fluid, in particular aqueous solution, 12.

FIG. 3 schematically shows a further embodiment of a medicinal product 10 according to the present invention.

The medicinal product 10 comprises a single, i.e. only one, container 14 and an aqueous liquid, in particular an aqueous solution, 12 containing bicarbonate. The container 14 comprises a first side wall 15*a* and a second side wall 15*b*. Both the first side wall 15*a* and the second side wall 15*b* comprise a barrier material. More specifically, the first side wall 15*a* and the second side wall 15*b* may comprise or consist of the same barrier material or may comprise or consist of a different barrier material.

The barrier material has preferably a water vapor transmission rate≤3.0 g $m^{-2}$ $day^{-1}$ and/or an oxygen transmission rate≤0.5 g $m^{-2}$ $day^{-1}$.

The container 14 is shaped or formed as a mono-chamber container, wherein the aqueous liquid, in particular aqueous solution, 12 is surrounded or encased, in particular completely and immediately surrounded or encased, by the first side wall 15*a* and the second side wall 15*b*.

The barrier material may be preferably aluminium oxide, silicon oxide, carbon such as diamond-like carbon, aluminium or an appropriate plastic material such as ethylene vinyl alcohol, polyvinyl alcohol, polyvinylidene chloride or a polyamide, in particular a polyamide which is commercially available under the notation "Nylon-MXD6".

Further, the container 14 may comprise a port 16 for emptying of the aqueous liquid, in particular aqueous solution, 12 out of the container 14.

Due to the barrier material, diffusion or escape of carbon dioxide from the container 14 and/or intake of carbon dioxide into the container 14 can be circumvented. Thus, formation of precipitations and/or (other) visible particles in the aqueous liquid, in particular aqueous solution, 12 can be avoided which might otherwise impair its stability.

As regards further features and advantages of the medicinal product 10 as shown in FIG. 3, reference is made in its entirety to the description of FIGS. 1 and 2.

EXAMPLES

TABLE 1

| Aqueous solutions containing bicarbonate according to the present invention | | | | |
|---|---|---|---|---|
| Electrolytes/Ingredients | Formula 1 [mmol/l] | Formula 2 [mmol/l] | Formula 3 [mmol/l] | Formula 4 [mmol/l] |
| $Na^+$ | 141 | 140 | 132 | 140 |
| $K^+$ | 4.0 | 4.0 | 4 | 4 |
| $Mg^{++}$ | 1.0 | 0.75 | 0.6 | 1 |
| $Ca^{++}$ | 0 | 1 | 1.6 | 0 |
| $Cl^-$ | 101 | 113 | 111 | 101 |
| $HCO_3^-$ | 28 | 35 | 17 | 28 |
| Gluconate | 18 | 0 | 3 | 17 |
| Citrate | — | 5 | 0.4 | — |
| Glucose | 0 | 0 | 0 | 55.5 |

Example 1

A bulk solution according to formula 1 is prepared at 25° C. in a vessel with a pH adjustment performed by adding carbon dioxide. The mixture is filtered through a 0.2 μm filter from Sartorius and then filled into a primary plastic container constituted of a CRYOVAC® brand multilayer polyolefins material from SEALED AIR®, this latter is inserted and sealed into a secondary container where the plastic film of both side walls is a polypropylene based material including a silicon oxide coating. The entire system is sterilized by autoclaving at 121° C. during at least 15 minutes.

Batch 15294-01

| | Time | | | | | |
|---|---|---|---|---|---|---|
| | 0 | 3 M | 6 M | 9 M | 12 M | 18 M |
| pH Storage at RT | 7.2 | 7.2 | 7.2 | 7.3 | 7.4 | 7.4 |
| pH Storage at 40° C. | 7.2 | 7.3 | 7.3 | 7.4 | — | — |

Batch 16142-01

| | Time | | | | | |
|---|---|---|---|---|---|---|
| | 0 | 3 M | 6 M | 9 M | 12 M | 18 M |
| pH Storage at RT | 7.2 | 7.2 | 7.2 | 7.2 | 7.3 | 7.3 |
| pH Storage at 40° C. | 7.2 | 7.2 | 7.4 | 7.4 | 7.5 | 7.6 |

Batch 16511-01A

| | Time | | | | |
|---|---|---|---|---|---|
| | 0 | 3 M | 6 M | 12 M | 18 M |
| pH Storage at RT | 7.0 | 7.0 | 7.0 | 7.0 | — |

Example 2

A bulk solution according to formula 1 is prepared at 25° C. in a vessel with a pH adjustment performed by adding carbon dioxide. The mixture is filtered on 0.2 μm filter from Sartorius and then filled into a primary plastic container constituted of a CRYOVACx brand multilayer polyolefins material from SEALED AIR®, this latter is inserted and sealed into a secondary container where the plastic film of both side walls is EVOH based material. The entire system is sterilized by autoclaving at 121° C. during at least 15 minutes.

Batch 15294-01c

| | Time | | | | |
|---|---|---|---|---|---|
| | O | 3 M | 6 M | 12 M | 18 M |
| pH Storage at RT | 7.7 | 7.8 | 7.7 | 9.1 | 7.8-8.4 |

Batch 16511-01B

| | Time Storage at 25° C. | | | | |
|---|---|---|---|---|---|
| | O | 3 M | 6 M | 12 M | 18 M |
| pH | 7.3 | 7.8 | 8.1 | 7.9 | — |

Example 3

A bulk solution according to formula 1 is prepared at 25° C. in a vessel with a pH adjustment performed by adding carbon dioxide. mixture is filtered through a 0.2 μm filter from Sartorius and then filled into a primary plastic container constituted of a CRYOVAC® brand multilayer polyolefins material from SEALED AIR®, this latter is inserted and sealed into a secondary container where the plastic film of both side walls is a polypropylene based material including an aluminium oxide coating (APP127 PolyCine GmbH). The entire system is sterilized by autoclaving at 121° C. during at least 15 minutes.

Batch 15294-01b

| | Time | | | | | |
|---|---|---|---|---|---|---|
| | 0 | 3 M | 6 M | 9 M | 12 M | 18 M |
| pH Storage at RT | 7.3 | 7.3 | 7.4 | 7.4 | 7.4 | 7.5 |
| pH Storage at 40° C. | 7.3 | 7.4 | — | — | | 7.6 (30° C.) |

Batch 15301-01

| | Time | | |
|---|---|---|---|
| | 0 | 3 M | 6 M |
| pH Storage at RT | 7.3 | 7.3 | 7.4 |
| pH Storage at 40° C. | 7.3 | 7.4 | 7.5 |

Example 4 (Comparative Example)

A bulk solution according to formula 1 is prepared at 25° C. in a vessel with a pH adjustment performed by adding carbon dioxide. The mixture is filtered through a 0.2 μm filter from Sartorius and then filled into a primary plastic container constituted of a multilayer polyolefins material, this latter is inserted and sealed into a secondary previously thermoformed where the plastic film of both wall sides is a multilayer polypropylene based material. The entire system is sterilized by autoclaving at 121° C. during at least 15 minutes.

Batch 16511-01C

| | Time | | | | |
|---|---|---|---|---|---|
| | 0 | 1 M | 3 M | 6 M | 12 M |
| pH storage at 25° C. | 7.5 | 8.3 | 8.7 | 8.9 | 9.0 |
| pH storage at 40° C. | 7.5 | 8.8 | 9.1 | 9.2 | 9.3 |

Example 5

A bulk solution according to formula 2 is prepared at 25° C. in a vessel with pH adjustment performed by adding carbon dioxide. mixture is filtered through a 0.2 μm filter from Sartorius and then filled into a primary plastic container constituted of a CRYOVAC® brand multilayer polyolefins material from SEALED AIR®, this latter is inserted and sealed into a secondary container where the plastic film of both side walls is a polypropylene based material including a silicon oxide coating. The entire system is sterilized by autoclaving at 121° C. during at least 15 minutes.

Batch 14094-02

| | Time | | | | | |
|---|---|---|---|---|---|---|
| | 0 | 1 M | 3 M | 6 M | 9 M | 13 M |
| pH Storage at RT | 7.2 | 7.2 | 7.2 | 7.2 | — | 7.2 |
| pH Storage at 40° C. | 7.2 | 7.2 | 7.2 | 7.2 | — | 7.3 |

Example 6

A bulk solution according to formula 2 is prepared at 25° C. in a vessel with pH adjustment performed by adding carbon dioxide. The mixture is filtered through a 0.2 μm filter from Sartorius and then filled into a primary plastic container constituted of a multilayer polypropylene based material including a silicon oxide coating. The entire system is sterilized by autoclaving at 121° C. during at least 15 minutes.

Batch 14094-02

| | Time | | | | | |
|---|---|---|---|---|---|---|
| | 0 | 1 M | 3 M | 6 M | 9 M | 13 M |
| pH Storage at RT | 7.0 | 7.1 | 7.3 | 7.6 | 7.8 | 7.9 |
| pH Storage at 40° C. | 7.0 | 7.4 | 7.9 | 8.3 | 8.5 | 8.5 |

Example 7

A bulk solution according to formula 2 is prepared at 25° C. in a vessel with pH adjustment performed by adding carbon dioxide. The mixture is filtered through a 0.2 μm filter from Sartorius and then filled into a primary plastic container constituted of a multilayer polypropylene based material including a silicon oxide coating, this latter is inserted and sealed into a secondary container where the plastic film of both side walls is a multilayer polypropylene based material including a silicon oxide coating. The entire system is sterilized by autoclaving at 121° C. during at least 15 minutes.

Batch 14094-02

| | Time | | | | | |
|---|---|---|---|---|---|---|
| | 0 | 1 M | 3 M | 6 M | 9 M | 13 M |
| pH Storage at RT | 7.0 | 7.1 | 7.1 | 7.2 | 7.2 | 7.1 |
| pH Storage at 40° C. | 7.0 | 7.2 | 7.2 | 7.3 | 7.4 | 7.3 |

Example 8

A bulk solution according to formula 3 is prepared at 25° C. in a vessel with pH adjustment performed by adding carbon dioxide. The mixture is filtered through a 0.2 μm filter from Sartorius and then filled into a primary plastic container constituted of a CRYOVAC® brand multilayer polyolefins material from SEALED AIR®, this latter is inserted and sealed into a secondary container where the plastic film of both side walls is a polypropylene based material including a silicon oxide coating. The entire system is sterilized by autoclaving at 121° C. during at least 15 minutes.

Batch 1548X

| | Time | | | | | |
|---|---|---|---|---|---|---|
| | 0 | 3 M | 5 M | 6 M | 9 M | 12 M |
| pH storage at 25° C. | 7.1 | 7.2 | 7.2 | 7.2 | 7.3 | 7.4 |
| pH storage at 40° C. | 7.1 | 7.3 | 7.3 | 7.4 | 7.5 | — |

Example 9

A bulk solution according to formula 4 is prepared at 25° C. in a vessel with a pH adjustment performed by adding carbon dioxide. The mixture is filtered through a 0.2 μm filter from Sartorius and then filled into a primary plastic container constituted of a CRYOVAC® brand multilayer polyolefins material from SEALED AIR®, this latter is inserted and sealed into a secondary container where the plastic film of both side walls is a polypropylene based material including a silicon oxide coating. The entire system is sterilized by autoclaving at 121° C. during at least 15 minutes.

Batch 15294-02

| | Time | | | | |
|---|---|---|---|---|---|
| | 0 | 3 M | 6 M | 12 M | 18 M (RT) |
| pH Storage at 40° C. | 6.5 | — | 6.5 | 6.6 | 6.4 |

Example 10 (Comparative Example)

A bulk solution according to formula 1 is prepared at 25° C. in a vessel with a pH adjustment performed by adding carbon dioxide. The mixture is filtered through a 0.2 μm filter from Sartorius and then filled into a primary plastic container constituted of a monolayer of polyethylene material. The entire system is sterilized by autoclaving at 111° C. during at least 8 minutes.

Batch 17241-02

| | Time | | |
|---|---|---|---|
| | 0 | 3 M | 6 M |
| pH storage at 25° C. | 7.2 | 8.5 | 8.8 |
| pH storage at 40° C. | 7.2 | 8.9 | 9.1 |

Example 11

A bulk solution according to formula 1 is prepared at 25° C. in a vessel with pH adjustment performed by adding carbon dioxide. The mixture is filtered on 0.2 μm filter from Sartorius and then filled into a primary plastic container constituted of a multilayer layer material containing low density polyethylene and a ROMMELAG® brand EVOH middle layer. The entire system is sterilized by autoclaving at 111° C. during at least 8 minutes.

Batch 17241-01

| | Time | | |
|---|---|---|---|
| | 0 | 3 M | 6 M |
| pH storage at 25° C. | 7.0 | 7.3 | 7.4 |
| pH storage at 40° C. | 7.2 | 8.3 | 8.5 |

Example 12

A bulk solution according to formula 1 is prepared at 25° C. in a vessel with a pH adjustment performed by adding carbon dioxide. The mixture is filtered on 0.2 μm filter from Sartorius and then filled into a primary plastic container constituted of a CRYOVAC® brand multilayer polyolefins material from SEALED AIR®, this latter is inserted and sealed into a secondary container where the first wall side is polyethylene terephthalate and polypropylene material with an aluminium oxide coating and the second wall side is multilayer polypropylene material including an aluminium foil. The entire system is sterilized by autoclaving at 121° C. during at least 15 minutes.

Batch 17393-01

| | Time | | | |
|---|---|---|---|---|
| | 0 | 3 M | 6 M | 12 M |
| pH storage at 25° C. | 7.4 | 7.4 | 7.5 | 7.5 |
| pH storage at 40° C. | 7.4 | 7.4 | 7.5 | 8.0 |

Example 13

A bulk solution according to formula 1 is prepared at 25° C. in a vessel with a pH adjustment performed by adding carbon dioxide The mixture is filtered on 0.2 μm filter from Sartorius and then filled into a primary plastic container constituted of a CRYOVAC® brand multilayer polyolefins material from SEALED AIR®, this latter is inserted and sealed into a secondary container where the plastic film of both wall sides are multilayer diamond-like carbon based material. The entire system is sterilized by autoclaving at 121° C. during at least 15 minutes.
Batch

| | Time | | | | |
|---|---|---|---|---|---|
| | 0 | 3 M | 6 M | 12 M | 24 M |
| pH storage at 25° C. | 7.7 | 7.9 | | | |

The invention claimed is:

1. A medicinal product comprising a flexible mono-chamber container and an aqueous liquid containing bicarbonate and having a physiological pH value, wherein the container comprises a first side wall and a second side wall, wherein the first side wall and the second side wall comprise a barrier material, wherein the barrier material is capable of preventing or retarding escape of carbon dioxide from the container and/or intake of carbon dioxide into the container such that a final pH-value of the aqueous liquid is maintained or substantially maintained during a shelf life of the medicinal product for at least nine months at 40° Celsius within no more than 0.2 pH-value difference from a starting pH-value.

2. The medicinal product according to claim 1, wherein the pH-value of the aqueous liquid is maintained or substantially maintained during a shelf life at room temperature of the medicinal product for 24, 30 or 36 months.

3. The medicinal product according to claim 1, wherein the pH-value of the aqueous liquid does not exceed 7.8 during the shelf life at room temperature of the medicinal product.

4. The medicinal product according to claim 1, wherein the first side wall and the second side wall are arranged opposite each other and are connected at the edges, thereby forming a storage volume.

5. The medicinal product according to claim 1, wherein:
the first side wall and the second side wall comprise the same barrier material; or
the first side wall and the second side wall comprise a different barrier material.

6. The medicinal product according to claim 1, wherein the barrier material is selected from the group consisting of aluminium oxide, silicon oxide, aluminium, diamond-like carbon, plastic material, ethylene vinyl alcohol, polyvinyl alcohol, polyvinylidene chloride, thermoplastic material of the phenoxy type, phenoxy polyolefin, polyamide, polyacrylonitrile, modified cellulose and combinations of at least two of said barrier materials.

7. The medicinal product according to claim 1, wherein:
the barrier material of the first side wall is selected from the group consisting of aluminium oxide, silicon oxide and a combination thereof, and the barrier material of the second side wall is aluminium,
the barrier material of both the first side wall and the second side wall is selected from the group consisting of aluminium oxide, silicon oxide and a combination thereof,
the barrier material of both the first side wall and the second side wall is diamond-like carbon,
the barrier material of both the first side wall and the second side wall is silicon oxide and both the first side wall and the second side wall additionally comprise a polyolefin,
the barrier material of both the first side wall and the second side wall is aluminium oxide and both the first side wall and the second side wall additionally comprise a polyolefin,
the barrier material of both the first side wall and the second side wall is aluminium and both the first side wall and the second side wall additionally comprise a polyolefin or
the barrier material of both the first side wall and the second side wall is ethylene vinyl alcohol and both the first side wall and the second side wall additionally comprise a polyolefin.

8. The medicinal product according to claim 1, wherein:
the first side wall and/or the second side wall have/has a single-layered or multilayered structure, wherein an upper or top layer of the structure and a lower or lowest layer of the structure comprise a different barrier material, wherein the upper or top layer comprises aluminium oxide or silicon oxide and the lower or lowest layer comprises aluminium or vice versa or wherein the upper or top layer comprises aluminium oxide and the lower or lowest layer comprises silicon oxide or vice versa,
the first side wall has a single-layered or multilayered structure, wherein an upper or top layer of the structure comprises aluminium oxide and/or a lower or lowest layer of the structure comprises silicon oxide or vice versa, and wherein the second side wall comprises aluminium,
the first side wall and/or the second side wall have/has a single-layered or multilayered structure comprising a polyolefin, and additionally have/has a layer comprising silicon oxide,
the first side wall and/or the second side wall have/has a single-layered or multilayered structure comprising a polyolefin and additionally have/has a layer comprising aluminium oxide or
the first side wall and/or the second side wall have/has a single-layered or multilayered structure comprising a polyolefin and additionally have/has a layer comprising aluminium.

9. The medicinal product according to claim 1, wherein the first side wall and/or the second side wall of the container have/has a thickness below 500 μm.

10. The medicinal product according to claim 1, wherein the container is in the form of an outer container and the medicinal product further comprises an inner mono-chamber container which is encased by the outer container, wherein the aqueous liquid is contained in the inner container.

11. The medicinal product according to claim 10, wherein the inner container has a wall comprising a wall material which is different from the barrier material of the outer container or which is the same material as the barrier material of the outer container.

12. The medicinal product according to claim 10, wherein the inner container has a multilayered wall, wherein an upper or top layer of the wall and a lower or lowest layer of the wall differ in terms of the wall material, wherein the upper or top layer comprises a polyolefin and the lower or lowest layer comprises polyethylene terephthalate or vice versa, or the upper or top layer comprises aluminium oxide and the lower or lowest layer comprises silicon oxide or vice versa, the wall of the inner container has a single-layered or multilayered structure comprising a polyolefin, and the first side wall and/or the second side wall of the outer container comprise/comprises or consist/consists of a polyolefin, and a layer comprising silicon oxide, the wall of the inner container has a single-layered or multilayered structure comprising a polyolefin, and the first side wall and/or the second side wall of the outer container comprise/comprises or consist/consists of ethylene vinyl alcohol, the wall of the inner container has a single-layered or multilayered structure comprising a polyolefin, and the first side wall and/or the second side wall of the outer container comprise/comprises or consist/consists of a polyolefin, and a layer, comprising aluminium oxide, the wall of the inner container has a single-layered or multilayered structure comprising a polyolefin, and additionally has a layer, wherein the layer comprises or consists of silicon oxide, and the first side wall and/or the second side wall of the outer container has a single-layered or multilayered structure comprising a polyolefin, and additionally has a layer, wherein the layer comprises or consists of silicon oxide, the wall of the inner container has a single-layered or multilayered structure comprising a polyolefin, the first side wall of the outer container comprises a polyolefin, and additionally has a layer, comprising aluminium oxide and the second side wall of the outer container has a single-layered or multilayered structure comprising a polyolefin, and additionally has a layer of aluminium, or the wall of the inner container has a single-layered or multilayered structure comprising a polyolefin, and the first side wall and/or the second side wall of the outer container has a single-layered or multilayered structure comprising diamond-like carbon.

13. The medicinal product according to claim 10, wherein the first side wall of the outer container comprises aluminium and the second side wall of the outer container comprises aluminium oxide or silicon oxide or vice versa.

14. The medicinal product according to claim 1, wherein the aqueous liquid contains 130 mmol/l to 150 mmol/l of sodium, 0 mmol/l to 5 mmol/l of potassium, 0 mmol/l to 2 mmol/l of calcium, 0 mmol/l to 2 mmol/l of magnesium, 90 mmol/l to 150 mmol/l of chloride, 10 mmol/l to 40 mmol/l of bicarbonate, 0 mmol/l to 30 mmol/l of gluconate, 0 mmol/l to 10 mmol/l of citrate and 0 mmol/l to 60 mmol/l of glucose.

15. The medicinal product according to claim 1, wherein:

the container or a wall or wall portion thereof are/is transparent and/or thermoformable and/or retortable, and/or the medicinal product is terminally or thermally sterilized.

16. The medicinal product according to claim 7, wherein the polyolefin is polypropylene and/or polyethylene.

17. The medicinal product according to claim 8, wherein the polyolefin is polypropylene and/or polyethylene.

18. The medicinal product according to claim 11, wherein the wall material of the inner container and the barrier material of the outer container are independently selected from the group of aluminium oxide, silicon oxide, aluminium, carbon, ethylene vinyl alcohol, polyvinyl alcohol, polyvinylidene chloride, thermoplastic material of the phenoxy type, phenoxy polyolefin, polyamide, polyolefin, modified cellulose and combinations of at least two of said barrier materials.

19. The medicinal product according to claim 1, wherein the aqueous liquid contains of 135 mmol/l to 145 mmol/l of sodium, 0 mmol/l to 4 mmol/l of potassium, 0 mmol/l to 1.5 mmol/l of calcium, 0 mmol/l to 1.5 mmol/l of magnesium, 95 mmol/l to 125 mmol/l of chloride, 20 mmol/l to 35 mmol/l of bicarbonate and 10 mmol/l to 25 mmol/l of gluconate, 0 mmol/l to 10 mmol/l of citrate and 0 mmol/l to 60 mmol/l of glucose.

20. The medicinal product according to claim 1, wherein the aqueous liquid contains of 135 mmol/l to 145 mmol/l of sodium, 4 mmol/l of potassium, 0.5 mmol/l to 1 mmol/l of calcium, 0 mmol/l to 1.5 mmol/l of magnesium, 100 mmol/l to 120 mmol/l of chloride, 24 mmol/l to 35 mmol/l of bicarbonate, 15 mmol/l to 20 mmol/l of gluconate, 0 mmol/l to 5 mmol/l of citrate and 0 mmol/l to 60 mmol/l of glucose.

21. The medicinal product according to claim 1, wherein:

the container is in the form of an outer container comprising the first side wall and the second side wall, and the medicinal product further comprises an inner monochamber container which is encased by the outer container, wherein the aqueous liquid is contained in the inner container;

the first side wall and the second side wall are arranged opposite each other and are connected at the edges, thereby forming a storage volume;

the first side wall is defined entirely by a laminate comprising aluminum; and the second side wall is defined entirely by transparent plastic.

22. The medicinal product according to claim 21, wherein the second side wall comprises a multilayer film including polyethylene terephthalate and aluminium or silicone oxide.

23. The medicinal product according to claim 22, wherein the first side wall comprises at least one plastic layer and at least one aluminum foil layer.

* * * * *